(12) United States Patent
Park et al.

(10) Patent No.: US 11,876,199 B2
(45) Date of Patent: Jan. 16, 2024

(54) BATTERY MODULE, BATTERY PACK COMPRISING SAME BATTERY MODULE, AND VEHICLE COMPRISING SAME BATTERY PACK

(71) Applicant: LG Chem, Ltd., Seoul (KR)

(72) Inventors: Sang-Jun Park, Daejeon (KR); Gyu-Jong Bae, Daejeon (KR)

(73) Assignee: LG Energy Solution, Ltd.

( * ) Notice: Subject to any disclaimer, the term of this patent is extended or adjusted under 35 U.S.C. 154(b) by 56 days.

(21) Appl. No.: 16/979,425

(22) PCT Filed: Aug. 22, 2019

(86) PCT No.: PCT/KR2019/010701
§ 371 (c)(1),
(2) Date: Sep. 9, 2020

(87) PCT Pub. No.: WO2020/054998
PCT Pub. Date: Mar. 19, 2020

(65) Prior Publication Data
US 2021/0005943 A1    Jan. 7, 2021

(30) Foreign Application Priority Data

Sep. 13, 2018  (KR) .................. 10-2018-0109838

(51) Int. Cl.
*H01M 10/6554* (2014.01)
*H01M 10/613* (2014.01)
(Continued)

(52) U.S. Cl.
CPC ..... *H01M 10/6554* (2015.04); *H01M 10/613* (2015.04); *H01M 10/625* (2015.04);
(Continued)

(58) Field of Classification Search
CPC ........ H01M 10/6553; H01M 10/6568; H01M 10/647; H01M 10/613; H01M 10/617;
(Continued)

(56) References Cited

U.S. PATENT DOCUMENTS

2011/0052960 A1    3/2011  Kwon et al.
2011/0070474 A1    3/2011  Lee et al.
(Continued)

FOREIGN PATENT DOCUMENTS

CN    102356504 A    2/2012
CN    106469839 A    3/2017
(Continued)

OTHER PUBLICATIONS

Chinese Search Report for Application No. 201910863390.8 dated Sep. 7, 2020, 1 page.
(Continued)

*Primary Examiner* — Stewart A Fraser
*Assistant Examiner* — Lilia Nedialkova
(74) *Attorney, Agent, or Firm* — Lerner David LLP

(57) ABSTRACT

A battery module includes a battery cell, a bus bar assembly connected to an electrode lead of the battery cell and positioned on both side surfaces of the battery cell, a heatsink positioned on at least one side of the battery cell and the bus bar assembly, and a pair of cooling plates connected perpendicularly to the heatsink and arranged in direct contact with the bus bar assembly.

7 Claims, 9 Drawing Sheets

(51) Int. Cl.
  *H01M 10/625* (2014.01)
  *H01M 10/653* (2014.01)
  *H01M 10/6556* (2014.01)
  *H01M 50/50* (2021.01)
  *H01M 50/211* (2021.01)
  *H01M 10/6567* (2014.01)

(52) U.S. Cl.
  CPC ..... *H01M 10/653* (2015.04); *H01M 10/6556* (2015.04); *H01M 10/6567* (2015.04); *H01M 50/211* (2021.01); *H01M 50/50* (2021.01); *H01M 2220/20* (2013.01)

(58) Field of Classification Search
  CPC ............. H01M 10/625; H01M 10/653; H01M 10/6551; H01M 10/6554; H01M 10/6556; H01M 10/6567; H01M 50/211; H01M 50/249; H01M 50/50; H01M 50/502; H01M 50/526; H01M 50/548; H01M 50/557; H01M 2220/20; Y02E 60/10
  See application file for complete search history.

(56) References Cited

U.S. PATENT DOCUMENTS

| | | | | |
|---|---|---|---|---|
| 2011/0212355 | A1* | 9/2011 | Essinger | H01M 10/6556 429/120 |
| 2012/0107663 | A1* | 5/2012 | Burgers | H01M 10/6556 429/120 |
| 2013/0295422 | A1 | 11/2013 | Kim et al. | |
| 2013/0309542 | A1* | 11/2013 | Merriman | B21D 53/08 29/890.038 |
| 2015/0194714 | A1 | 7/2015 | You et al. | |
| 2015/0207187 | A1* | 7/2015 | Beltz | B23P 15/26 29/890.035 |
| 2015/0318587 | A1 | 11/2015 | Kim et al. | |
| 2016/0087319 | A1 | 3/2016 | Roh et al. | |
| 2017/0125858 | A1* | 5/2017 | Miller | H01M 10/625 |
| 2018/0261898 | A1* | 9/2018 | Kellner | H01M 50/227 |
| 2018/0287226 | A1 | 10/2018 | Yoo et al. | |
| 2019/0074557 | A1 | 3/2019 | Shin et al. | |
| 2019/0334218 | A1 | 10/2019 | Choi et al. | |

FOREIGN PATENT DOCUMENTS

| | | | |
|---|---|---|---|
| CN | 108140793 | A | 6/2018 |
| CN | 210468034 | U | 5/2020 |
| EP | 3671945 | A1 | 6/2020 |
| JP | 2006139928 | A | 6/2006 |
| JP | 2013062023 | A | 4/2013 |
| JP | 2013229266 | A | 11/2013 |
| JP | 2014216298 | A | 11/2014 |
| JP | 2016029660 | A | 3/2016 |
| JP | 2016511509 | A | 4/2016 |
| KR | 20140014413 | A | 2/2014 |
| KR | 101601149 | B1 | 3/2016 |
| KR | 20170021122 | A | 2/2017 |
| KR | 20170070795 | A | 6/2017 |
| KR | 20170095052 | A | 8/2017 |
| KR | 20170142445 | A | 12/2017 |
| KR | 20180007436 | A | 1/2018 |
| WO | WO-2017138704 | A1 * | 8/2017 .......... H01M 10/625 |

OTHER PUBLICATIONS

International Search Report for Application No. PCT/KR2019/010701, dated Nov. 28, 2019, pp. 1-2.

Extended European Search Report including Written Opinion for Application No. 19860960.4 dated May 6, 2021, pp. 1-7.

* cited by examiner

BATTERY MODULE, BATTERY PACK COMPRISING SAME BATTERY MODULE, AND VEHICLE COMPRISING SAME BATTERY PACK

CROSS-REFERENCE TO RELATED APPLICATIONS

The present application is a national phase entry under 35 U.S.C. § 371 of International Application No. PCT/KR2019/010701 filed Aug. 22, 2019, which claims priority from Korean Patent Application No. 10-2018-0109838 filed on Sep. 13, 2018 in the Republic of Korea, the disclosures of which are incorporated herein by reference.

TECHNICAL FIELD

The present disclosure relates to a battery module, a battery pack including the battery module, and a vehicle including the battery pack.

BACKGROUND ART

Secondary batteries, which are highly useful in various products and exhibit superior electrical properties such as high energy density, etc. are commonly used not only in portable devices but also in electric vehicles (EVs) or hybrid electric vehicles (HEVs) driven by electrical power sources. The secondary battery is drawing attention as a new energy source for its environmental friendliness and energy efficiency, in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module having at least one battery cell first, and then configure a battery pack by using at least one battery module and adding other components.

In the conventional battery module or battery pack, in recent years, as the capacity and output of the battery has been gradually increased, better cooling performance has been demanded. For this, recently, in the case of a battery cell, for example a pouch-type secondary battery, the total length of the pouch-type secondary battery has been increased in order to obtain greater energy.

However, as the total length of the pouch-type secondary battery increases, the temperature deviation inside the battery cell becomes large. Moreover, due to the heat generation at the electrode lead of the pouch-type secondary battery, a portion near the electrode lead is locally heated more than other portions.

Therefore, it is required to find a method for improving the cooling temperature deviation of the battery cell when the battery module or the battery pack is cooled.

DISCLOSURE

Technical Problem

The present disclosure is directed to providing a battery module, which may improve a cooling temperature deviation of a battery cell when cooling a battery module or a battery pack, a battery pack including the battery module, and a vehicle including the battery pack.

Technical Solution

In one aspect of the present disclosure, there is provided a battery module, comprising: at least one battery cell; a bus bar assembly connected to an electrode lead of the at least one battery cell and provided to both side surfaces of the at least one battery cell; at least one heatsink provided to at least one side of the at least one battery cell and the bus bar assembly; and a pair of cooling plates connected perpendicular to the at least one heatsink and provided in direct contact with the bus bar assembly.

The bus bar assembly may include a bus bar housing mounted to both sides of the at least one battery cell; a connection bus bar provided to the bus bar housing to contact the electrode lead of the at least one battery cell; and a heat transfer member configured to guide connection of the connection bus bar and the pair of cooling plates.

The heat transfer member may be mounted to the connection bus bar and provided in direct contact with the connection bus bar and the pair of cooling plates, respectively.

The heat transfer member may be made of a thermal interface material.

The heatsink may be provided in a pair, and the pair of heatsinks may have an inner channel for a cooling water to flow and cover one side and the other side of the at least one battery cell and the bus bar assembly.

The pair of heatsinks may include a lower heatsink configured to cover a lower side of the at least one battery cell and the bus bar assembly; and an upper heatsink disposed opposite to the lower heatsink and configured to cover an upper side of the at least one battery cell and the bus bar assembly.

The battery module may further comprise a perimeter tube configured to surround the pair of cooling plates at least partially and communicate with the at least one heatsink.

The perimeter tube may include a tube body configured to surround each cooling plate at least partially and having an inner channel; at least one cooling water supply tube configured to communicate between the tube body and the at least one heatsink and to supply a cooling water to the tube body; and at least one cooling water discharge tube spaced apart from the cooling water supply tube by a predetermined distance and configured to communicate between the tube body and the at least one heatsink so that the cooling water in the tube body is discharged to the at least one heatsink.

In addition, the present disclosure provides a battery pack, comprising: at least one battery module according to the above embodiments; and a pack case configured to package the at least one battery module.

Moreover, the present disclosure provides a vehicle, comprising at least one battery pack according to the above embodiment.

Advantageous Effects

According to various embodiments as above, it is possible to provide a battery module, which may improve a cooling temperature deviation of a battery cell when cooling a battery module or a battery pack, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease of understanding the present disclosure, the accompanying drawings are not drawn to real scale, but the dimensions of some components may be exaggerated.

Figure 1:
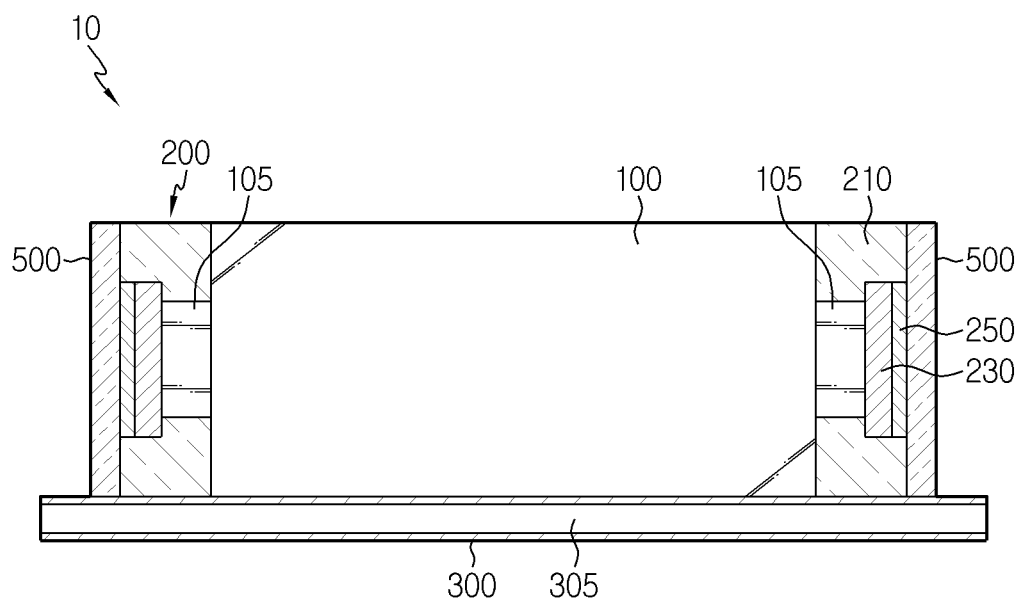
FIG. 1 is a diagrammatic sectional view illustrating a battery module according to an embodiment of the present disclosure.

FIG. 1 is a diagrammatic sectional view illustrating a battery module according to an embodiment of the present disclosure.

Referring to FIG. 1, the battery module 10 may include a battery cell 100, a bus bar assembly 200, a heatsink 300, and a cooling plate 500.

The battery cell 100 is a secondary battery and may be provided as a pouch-type secondary battery, a rectangular secondary battery or a cylindrical secondary battery. Hereinafter, in this embodiment, the battery cell 100 is described as a pouch-type secondary battery.

One or more battery cells 100 may be provided. If a plurality of battery cells 100 are provided, the plurality of battery cell 100 may be electrically connected to each other.

The bus bar assembly 200 is connected to an electrode lead 105 of the at least one battery cell 100 and may be provided to both side surfaces of the at least one battery cell 100.

The bus bar assembly 200 may include a bus bar housing 210, a connection bus bar 230, and a heat transfer member 250.

The bus bar housing 210 is mounted to both sides of the at least one battery cell 100 and may cover both sides of the at least one battery cell 100. The bus bar housing 210 may have a size capable of covering both sides of the at least one battery cell 100.

The connection bus bar 230 is provided to the bus bar housing 210 and may be in contact with the at least one electrode lead 105 for electrical connection with the at least one battery cell 100. The connection bus bar 230 may be fixed to the at least one electrode lead 105 by laser welding.

The heat transfer member 250 may guide the connection of the connection bus bar 230 and the pair of cooling plates 500, explained later. Specifically, the heat transfer member 250 may be mounted to the connection bus bar 230 and be in direct contact with the connection bus bar 230 and the pair of cooling plates 500, explained later.

The heat transfer member 250 may be made of a thermal interface material with high heat transfer efficiency. Moreover, the heat transfer member 250 may perform an insulation function between the connection bus bar 230 and the pair of cooling plates 500, explained later.

The heatsink 300 may be provided to at least one side of the at least one battery cell 100 and the bus bar assembly 200. Specifically, the heatsink 300 may be provided to a lower side of the at least one battery cell 100 and the bus bar assembly 200. The heatsink 300 may have an inner channel 305 through which a cooling water flows.

A pair of the cooling plates 500 may be provided. The pair of cooling plates 500 are connected perpendicular to the heatsink 300 and may be in direct contact with the bus bar assembly 200. The cooling plate 500 may be made of a metal material with high thermal conductivity.

Hereinafter, a heat transfer path and a cooling water flow of the battery module 10 according to this embodiment will be described in more detail.

Figure 2:
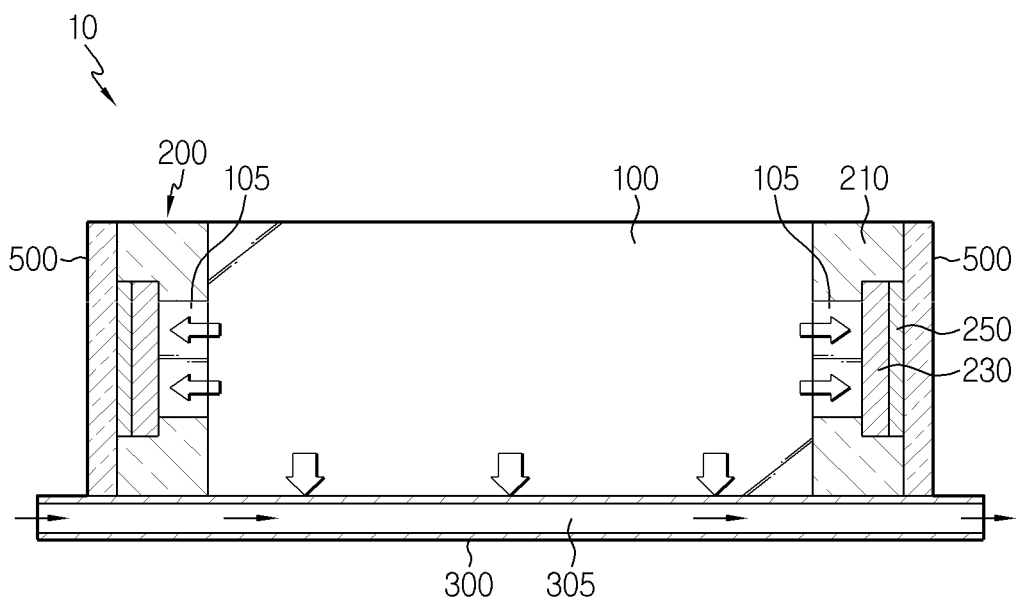
FIG. 2 is a diagrammatic sectional view illustrating a heat transfer path and a cooling water flow of the battery module of FIG. 1.

FIG. 2 is a diagrammatic sectional view illustrating a heat transfer path and a cooling water flow of the battery module of FIG. 1.

Referring to FIG. 2, when the at least one battery cell 100 is heated, the generated heat of the at least one battery cell 100 may be transferred to the heatsink 300. The heatsink 300 may cool the at least one battery cell 100 according to the cooling water flow formed through the inner channel 305.

In addition, the heat generated at both sides of the at least one battery cell 100, namely at the electrode lead 105 and the connection bus bar 230 of the bus bar assembly 200, may be transferred to the pair of cooling plates 500.

Here, the heat transfer member 250 of the bus bar assembly 200 allows the heat generated at the electrode lead 105 and the connection bus bar 230 of the at least one battery cell 100 to be transferred more rapidly to the pair of cooling plates 500.

Since the pair of cooling plates 500 are connected to the heat transfer member 250 and the heatsink 300, the heat generated at the electrode lead 105 of the at least one battery cell 100 and the connection bus bar 230 of the bus bar assembly 200 may also be cooled effectively.

Specifically, the heat transfer at both sides of the at least one battery cell 100 may be performed in the following order: the at least one battery cell 100, the electrode lead 105, the connection bus bar 230, the heat transfer member 250, the pair of cooling plates 500 and the heatsink 300.

As described above, in this embodiment, by means of the pair of cooling plates 500, it is possible to effectively prevent the cooling deviation of the at least one battery cell 100, which is caused since a portion near the electrode lead 105 is locally heated more than other portions due to the heat generation at the electrode lead 105 of the at least one battery cell 100.

Thus, in this embodiment, the cooling temperature deviation that may occur while cooling the at least one battery cell 100 may be greatly improved by means of the pair of cooling plates 500 connected to the heat transfer member 250 of the bus bar assembly 200 and the heatsink 300.

Figure 3:
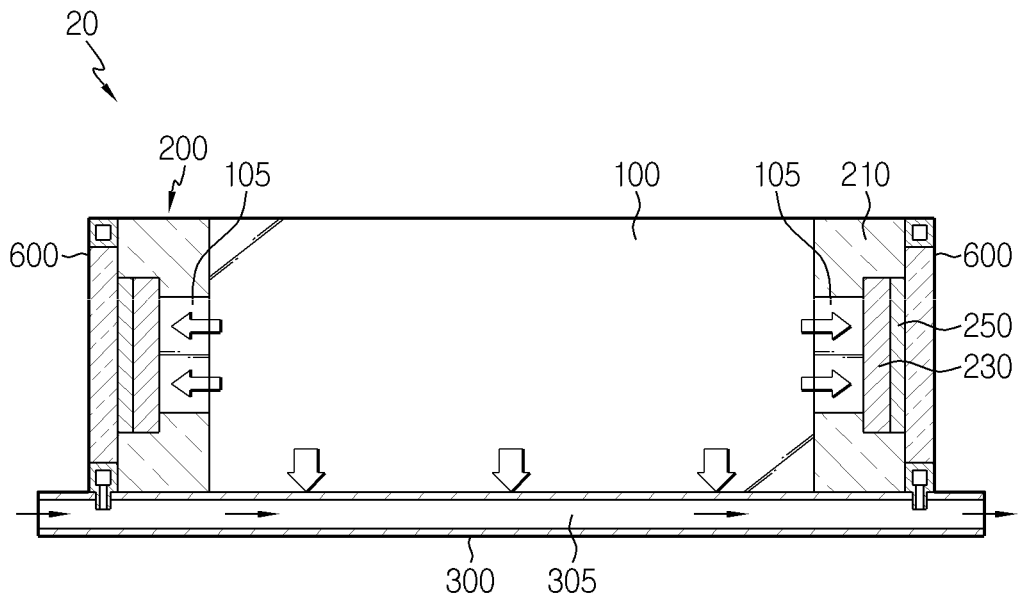
FIGS. 3 and 4 are diagrammatic sectional views illustrating a battery module according to another embodiment of the present disclosure.
Figure 4:
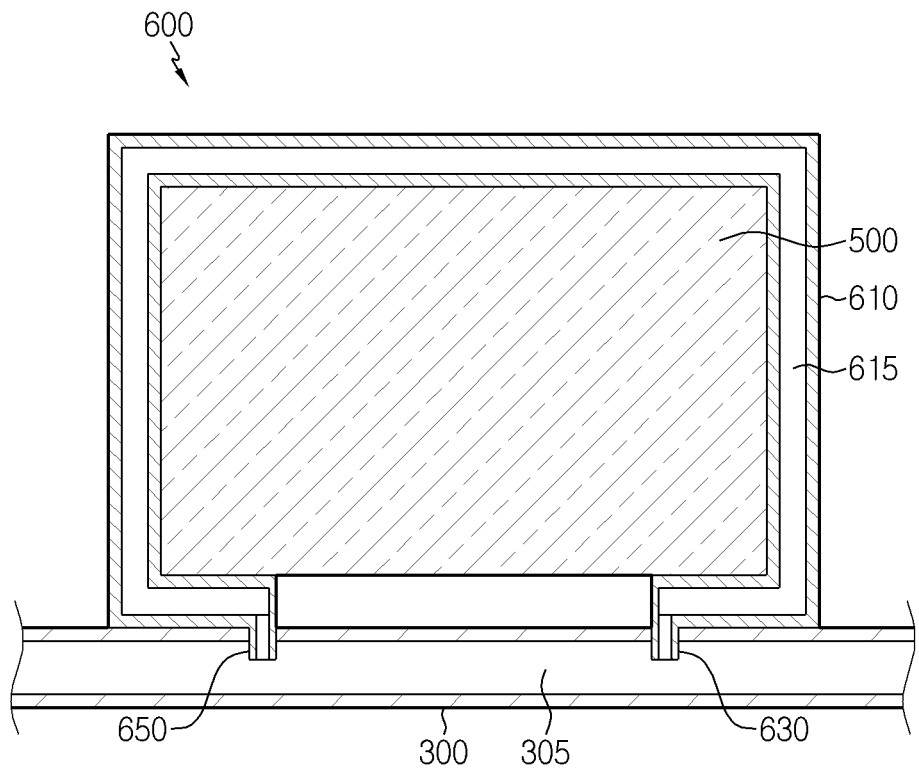

FIGS. 3 and 4 are diagrammatic sectional views illustrating a battery module according to another embodiment of the present disclosure.

Since the battery module 20 according to this embodiment is similar to the battery module 10 of the former embodiment, the features substantially identical or similar to those of the former embodiment will not described in detail, and features different from the former embodiment will be described in detail.

Referring to FIGS. 3 and 4, the battery module 20 may include the battery cell 100, the bus bar assembly 200, the heatsink 300, the cooling plate 500, and a perimeter tube 600.

Since the battery cell 100, the bus bar assembly 200, the heatsink 300 and the cooling plate 500 are substantially identical or similar to the former embodiment, hereinafter, they will not be described in detail.

A pair of the perimeter tubes 600 may be provided. The pair of perimeter tubes 600 surrounds the respective pair of cooling plates 500 at least partially, and the perimeter tubes 600 may communicate with the heatsink 300.

Specifically, each of the pair of perimeter tubes 600 may surround a rim of the respective cooling plate 500 so as to be in contact with the rim of the cooling plate 500.

Each of the pair of perimeter tubes 600 may include a tube body 610, a cooling water supply tube 630 and a cooling water discharge tube 650.

The tube body 610 may surround each cooling plate 500 at least partially. An inner channel 615 through which a cooling water flows may be provided inside the tube body 610.

The cooling water supply tube 630 communicates the tube body 610 with the heatsink 300 and may supply the cooling water in the heatsink 300 to the tube body 610.

The cooling water discharge tube 650 is spaced apart from the cooling water supply tube 630 by a predetermined distance and may communicate the cooling channel 615 of the tube body 610 with the heatsink 300 so that the cooling water in the tube body 610 is discharged to the heatsink 300.

Hereinafter, the cooling through the perimeter tube 600 of the battery module 10 will be described in more detail.

Figure 5:
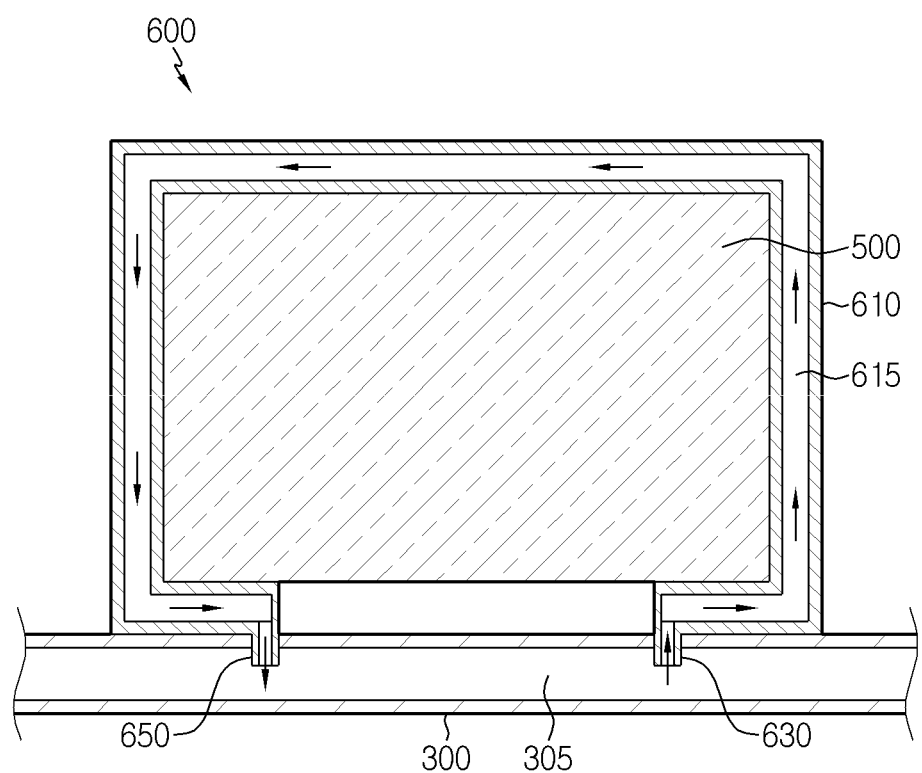
FIG. 5 is a diagrammatic sectional view illustrating a cooling water flow of a perimeter tube, employed in the battery module of FIG. 3.

FIG. 5 is a diagrammatic sectional view illustrating a cooling water flow of a perimeter tube, employed in the battery module of FIG. 3.

Referring to FIG. 5, the cooling water in the heatsink 300 may flow to the tube body 610 of the perimeter tube 600 through the cooling water supply tube 630 of the perimeter tube 600.

The cooling water introduced into the tube body 610 may flow along the inner channel 615 of the tube body 610 and be discharged again to the inner channel 305 of the heatsink 300 through the cooling water discharge tube 650.

In this embodiment, the temperature of the cooling plate 500 disposed inside the perimeter tube 600 may be further lowered by means of the perimeter tube 600, so that the temperature of the portion near the electrode lead 105 (see FIG. 3) of the at least one battery cell 100 may be lowered more greatly.

Accordingly, in this embodiment, by means of the perimeter tube 600, it is possible to effectively prevent the cooling deviation between the portion near the electrode lead 105 and other portions, which can be caused by the heat generation at the electrode lead 105 of the at least one battery cell 100.

Figure 6:
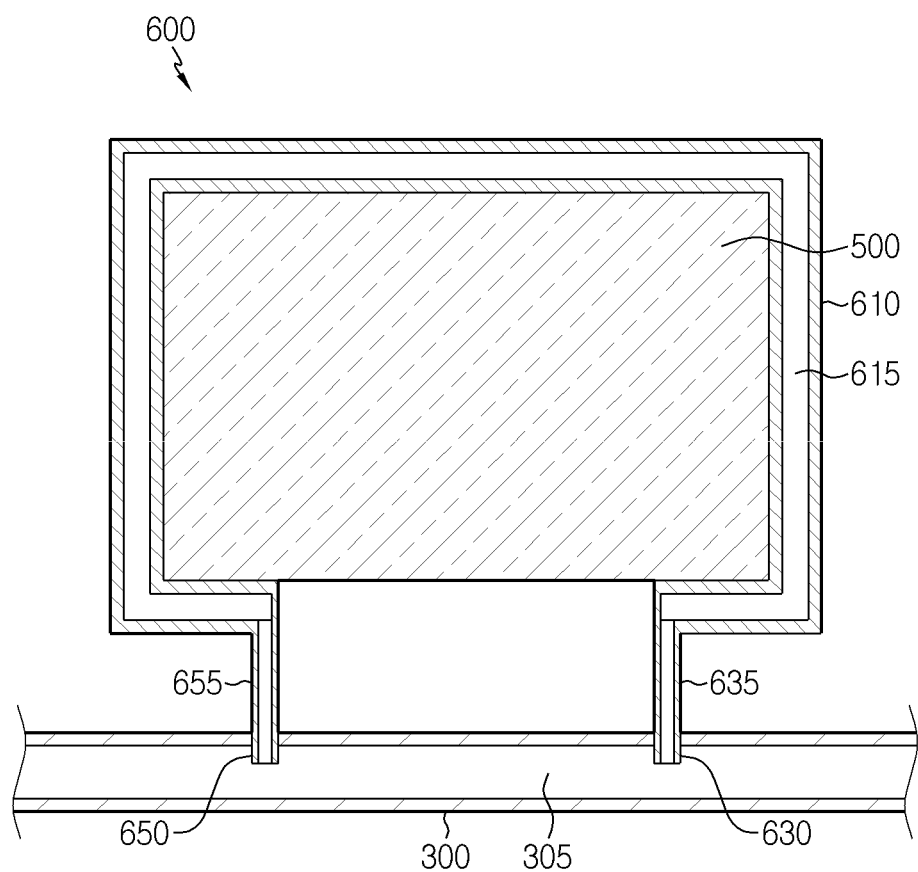
FIG. 6 is a diagrammatic sectional view illustrating a perimeter tube according to another embodiment, employed in the battery module of FIG. 3.

FIG. 6 is a diagrammatic sectional view illustrating a perimeter tube according to another embodiment, employed in the battery module of FIG. 3.

Referring to FIG. 6, a cooling water supply tube 635 and a cooling water discharge tube 655 of the perimeter tube 600 may be formed to have a predetermined length so that the tube body 610 is spaced apart from the heatsink 300 by a predetermined distance, as long as the cooling water may be supplied and discharged between the heatsink 300 and the tube body 610.

Figure 7:
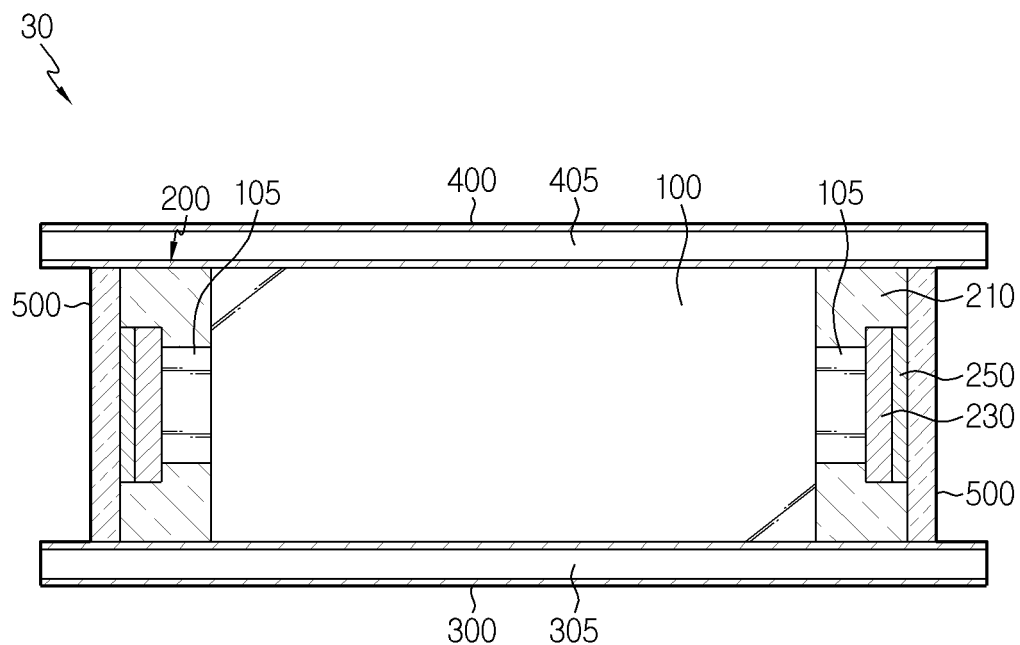
FIG. 7 is a diagrammatic sectional view illustrating a battery module according to still another embodiment of the present disclosure.

FIG. 7 is a diagrammatic sectional view illustrating a battery module according to still another embodiment of the present disclosure.

Since the battery module 30 according to this embodiment is similar to the battery modules 10, 20 of the former embodiments, the features substantially identical or similar to those of the former embodiment will not described in detail, and features different from the former embodiments will be described in detail.

Referring to FIG. 7, the battery module 30 may include the battery cell 100, the bus bar assembly 200, a pair of heatsinks 300, 400, and the cooling plate 500.

Since the battery cell 100 and the bus bar assembly 200 are substantially identical or similar to the former embodiments, they will not be described in detail hereinafter.

The pair of heatsinks 300, 400 may include inner channels 305, 405 for the cooling water to flow and cover one side and the other side of the at least one battery cell 100 and the bus bar assembly 200.

The pair of heatsinks 300, 400 may include the lower heatsink 300 and the upper heatsink 400.

The lower heatsink 300 has the inner channel 305 and may cover the lower side of the at least one battery cell 100 and the bus bar assembly 200. The lower heatsink 300 may be disposed in contact with the lower side of the pair of cooling plates 500.

The upper heatsink 400 has the inner channel 405 and may cover the upper side of the at least one battery cell 100 and the bus bar assembly 200. The upper heatsink 400 may be disposed in contact with the upper side of the pair of cooling plates 500.

Hereinafter, the heat transfer path and the cooling water flow of the battery module 30 according to this embodiment will be described in more detail.

Figure 8:
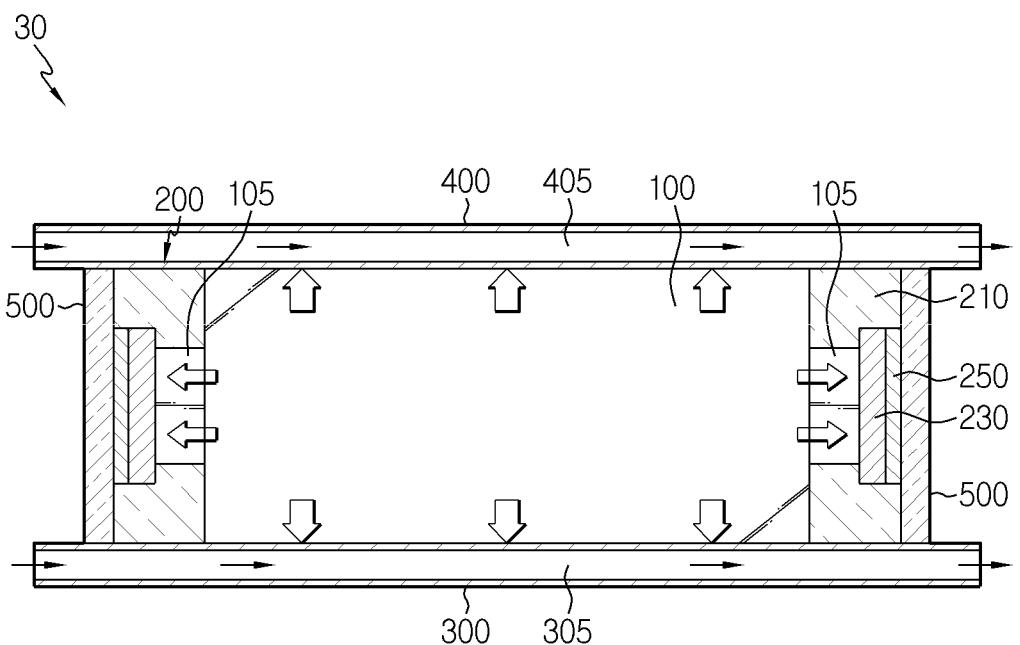
FIG. 8 is a diagrammatic sectional view illustrating a heat transfer path and a cooling water flow of the battery module of FIG. 7.

FIG. 8 is a diagrammatic sectional view illustrating a heat transfer path and a cooling water flow of the battery module of FIG. 7.

Referring to FIG. 8, the heat generated at the at least one battery cell 100 may be transferred to the lower heatsink 300 and the upper heatsink 400. In addition, the heat generated at the electrode lead 105 of the at least one battery cell 100 and the connection bus bar 230 of the bus bar assembly 200 may be transferred to the lower heatsink 300 and the upper heatsink 400 through the heat transfer member 250 and the cooling plate 500, respectively.

Accordingly, in this embodiment, a dual cooling structure using the upper heatsink 400 and the lower heatsink 300 is implemented, thereby further improving the cooling performance.

Figure 9:
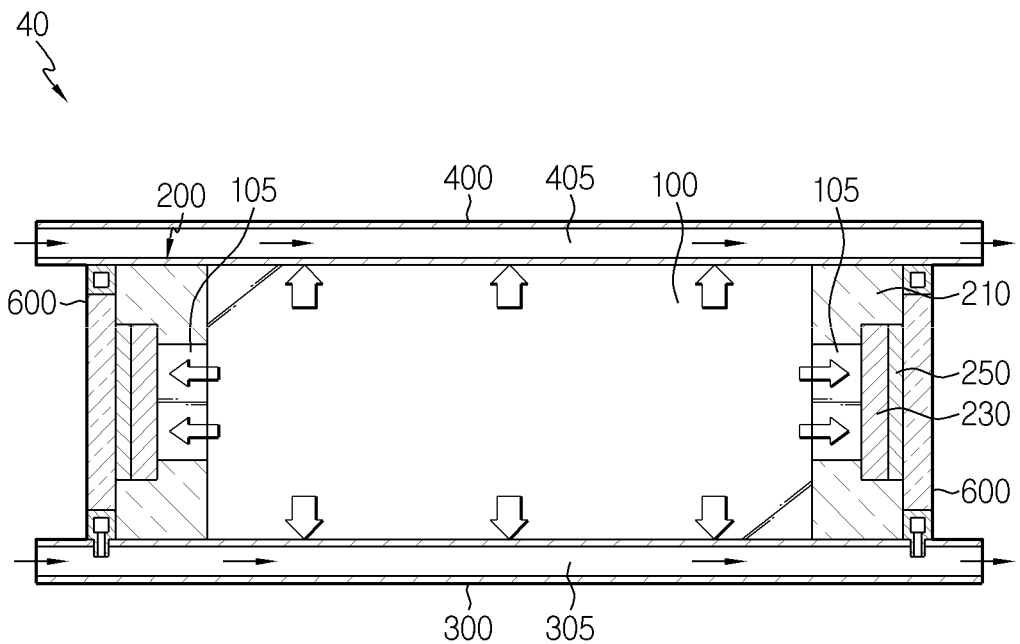
FIGS. 9 and 10 are diagrammatic sectional views illustrating a battery module according to still another embodiment of the present disclosure.
Figure 10:
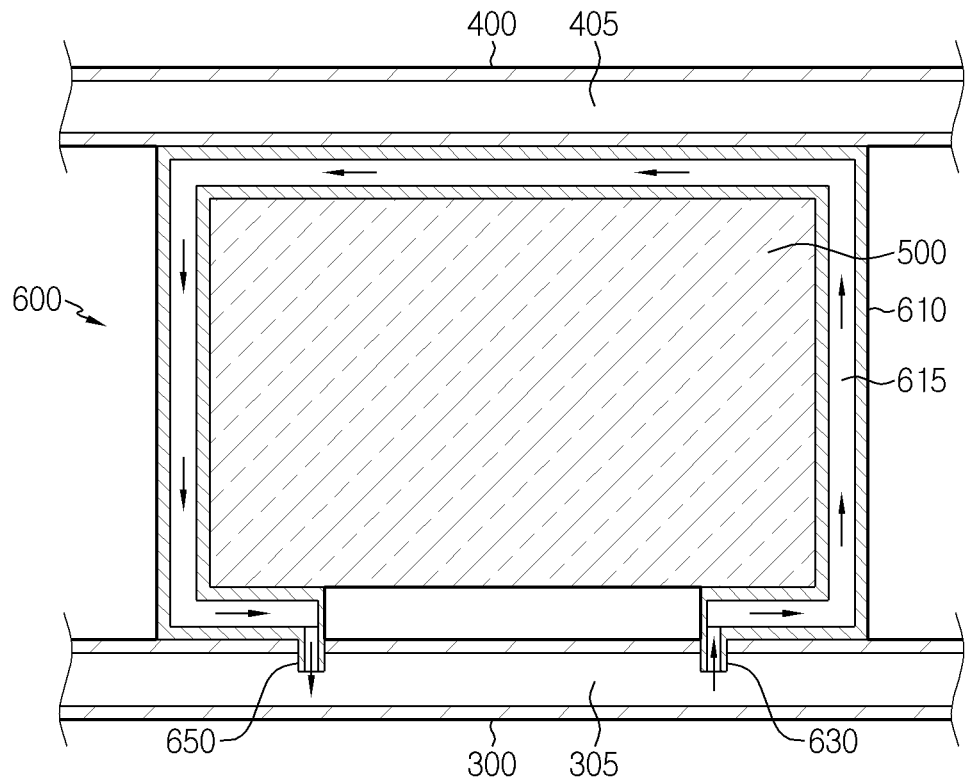

FIGS. 9 and 10 are diagrammatic sectional views illustrating a battery module according to still another embodiment of the present disclosure.

Since the battery module 40 according to this embodiment is similar to the battery modules 10, 20, 30 of the former embodiments, the features substantially identical or similar to those of the former embodiment will not described in detail, and features different from the former embodiments will be described in detail.

Referring to FIGS. 9 and 10, the battery module 40 may include the battery cell 100, the bus bar assembly 200, the pair of heatsinks 300, 400, the cooling plate 500, and the pair of perimeter tubes 600.

Since the battery cell 100 and the bus bar assembly 200 are substantially identical or similar to the former embodiments, hereinafter, they will not be described in detail.

The pair of heatsinks 300, 400 may include the lower heatsink 300 and the upper heatsink 400.

Since the lower heatsink 300 and the upper heatsink 400 are substantially identical or similar to the former embodiments, hereinafter, they will not be described in detail.

Since the cooling plate 500 is substantially identical or similar to the former embodiments, hereinafter, they will not be described in detail.

Each of the pair of perimeter tubes 600 may include a tube body 610, a cooling water supply tube 630 and a cooling water discharge tube 650.

An upper side of the tube body 610 may be disposed in contact with the bottom of the upper heatsink 400. Accordingly, in this embodiment, the cooling performance of the tube body 610 may be further improved, thereby lowering the temperature of the cooling plate 500 even further.

Since the cooling water supply tube 630 and the cooling water discharge tube 650 are substantially identical or similar to the former embodiments, hereinafter, they will not be described in detail.

As described above, in this embodiment, since the upper heatsink 400 is disposed in contact with the perimeter tube 600, it is possible to further improve the cooling performance of the perimeter tube 600.

Figure 11:
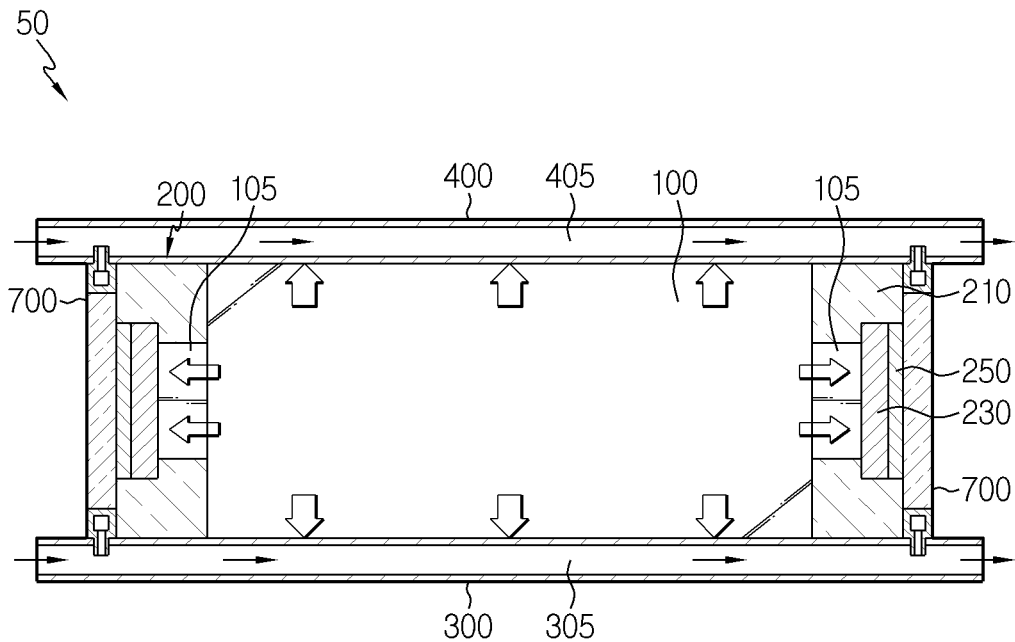
FIGS. 11 and 12 are diagrammatic sectional views illustrating a battery module according to still another embodiment of the present disclosure.
Figure 12:
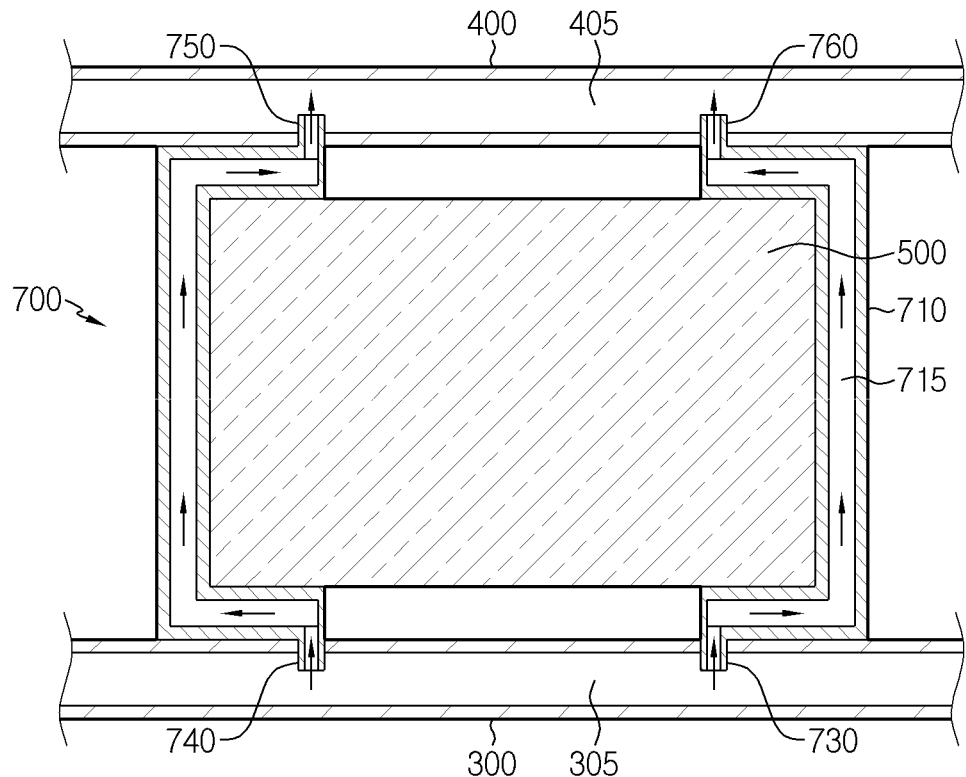

FIGS. 11 and 12 are diagrammatic sectional views illustrating a battery module according to still another embodiment of the present disclosure.

Since the battery module 50 according to this embodiment is similar to the battery modules 10, 20, 30, 40 of the former embodiments, the features substantially identical or similar to those of the former embodiment will not described in detail, and features different from the former embodiments will be described in detail.

Referring to FIGS. 11 and 12, the battery module 50 may include the battery cell 100, the bus bar assembly 200, the pair of heatsinks 300, 400, the cooling plate 500, and a pair of perimeter tubes 700.

Since the battery cell 100 and the bus bar assembly 200 are substantially identical or similar to the former embodiments, hereinafter, they will not be described in detail.

The pair of heatsinks 300, 400 may include the lower heatsink 300 and the upper heatsink 400.

The lower heatsink 300 and the upper heatsink 400 may be formed to have different flow rates of the cooling water flowing therein. In this embodiment, the flow rate in the lower heatsink 300 may be greater than the flow rate in the upper heatsink 400.

Since the cooling plate 500 is substantially identical or similar to the former embodiments, hereinafter, they will not be described in detail.

Each of the pair of perimeter tubes 700 may include a tube body 710, a cooling water supply tube 730, 740 and a cooling water discharge tube 750, 760.

The tube body 710 has an inner channel 715 and surrounds the rim of the cooling plate 500, and may be disposed to contact the top surface of the lower heatsink 300 and the bottom surface of the upper heatsink 400 or to be spaced apart therefrom by a predetermined distance.

A pair of the cooling water supply tubes 730, 740 may be provided. The pair of cooling water supply tubes 730, 740 are provided at the bottom of the tube body 710, respectively, and may communicate with the inner channel 305 of the lower heatsink 300.

A pair of the cooling water discharge tubes 750, 760 may be provided. The pair of cooling water discharge tubes 750, 760 are provided at the top of the tube body 710, respectively, and may communicate with the inner channel 405 of the upper heatsink 400.

As described above, in this embodiment, each of the pair of perimeter tubes 700 may include the pair of cooling water supply tubes 730, 740 and the pair of cooling water discharge tubes 750, 760. In this case, the cooling water may flow at different flow rates in the lower heatsink 300 and the upper heatsink 400 as described above.

Meanwhile, if the flow rate in the lower heatsink 300 is smaller than the flow rate in the upper heatsink 400, the pair of cooling water supply tubes 730, 740 may be provided at the top of the tube body 710 and the pair of cooling water discharge tubes 750, 760 may be provided at the bottom of the tube body 710.

Figure 13:
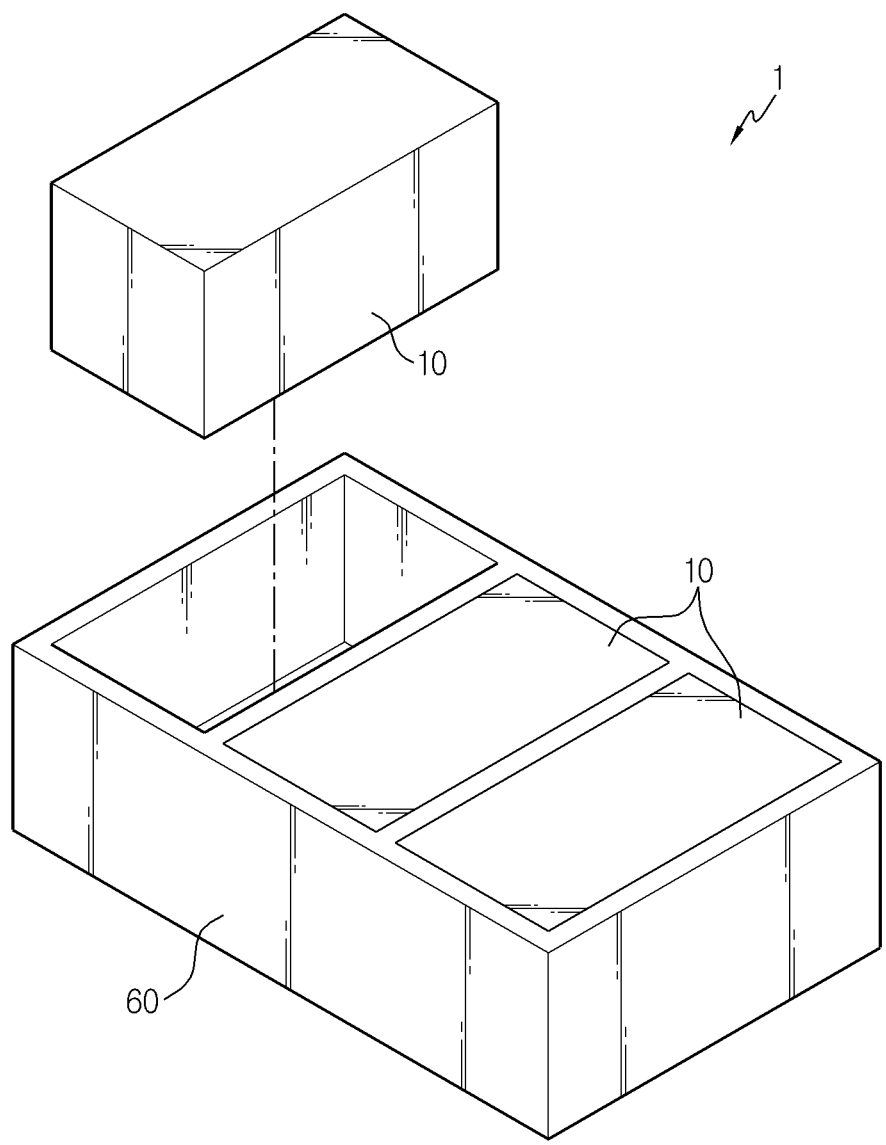
FIG. 13 is a diagrammatic partially exploded view illustrating a battery pack according to an embodiment of the present disclosure.
Figure 14:
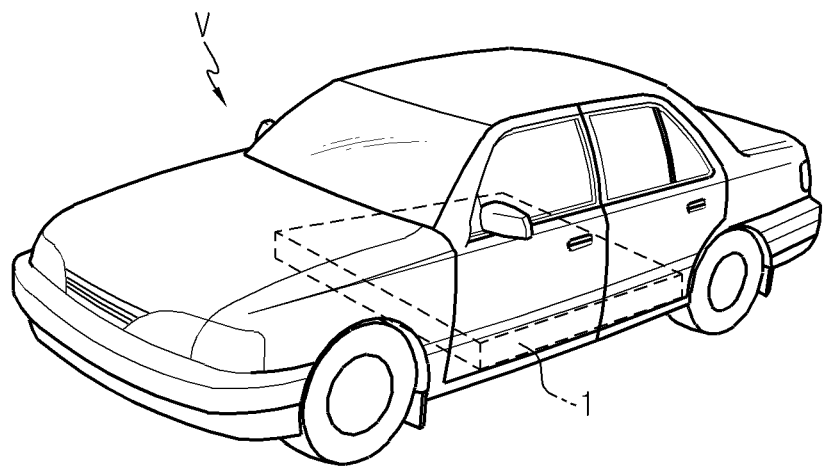
FIG. 14 is a diagram illustrating a vehicle according to an embodiment of the present disclosure.

FIG. 13 is a diagrammatic partially exploded view illustrating a battery pack according to an embodiment of the present disclosure, and FIG. 14 is a diagram illustrating a vehicle according to an embodiment of the present disclosure.

Referring to FIGS. 13 and 14, a battery pack 1 may include at least one battery module 10 according to the former embodiments and a pack case 60 for packaging the at least one battery module 10.

The at least one battery module may be provided as any one of the battery modules 20, 30, 40, 50 of the former embodiments, or a plurality of such battery modules may also be provided. If a plurality of the battery modules are provided, the plurality of battery modules may be an aggregate of the battery module 10 of the former embodiment and the battery modules 20, 30, 40, 50.

The battery pack 1 may be provided to a vehicle V as a fuel source of the vehicle V. As an example, the battery pack 1 may be provided to a vehicle V such as an electric vehicle, a hybrid vehicle, and various other-type vehicles capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities, such as a vehicle V, which have the battery pack 1, include the battery module 10, 20 as described above, and thus it is possible to implement a battery pack 1 having all the advantages of the battery module 10, 20 described above, or devices, instruments, facilities or the like, such as a vehicle V, which have the battery pack 1.

According to various embodiments as above, it is possible to provide the battery module 10, 20, 30, 40, 50, which may improve a cooling temperature deviation of the battery cell 100 when cooling the battery module or the battery pack, the battery pack 1 including the battery module 10, 20, 30, 40, 50, and the vehicle V including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   at least one battery cell extending along an axis between opposing first and second sides of the at least one battery cell, the at least one battery cell including a first electrode lead positioned on the first side and a second electrode lead positioned on the second side;
   a bus bar assembly including a first bus bar assembly portion connected to the first electrode lead and a second bus bar assembly portion connected to the second electrode lead, such that the first and second bus bar assembly portions are positioned along the opposing first and second sides of the at least one battery cell, respectively;
   a pair of heatsinks each having an internal channel configured to allow a coolant to flow therethrough, the pair of heatsinks including a lower heatsink and an upper heatsink, the lower heatsink configured to extend along a lower side of the at least one battery cell, and the upper heatsink disposed opposite to the lower heatsink and configured to extend along an upper side of the at least one battery cell; and
   a pair of cooling plates connected to the pair of heatsinks and oriented orthogonally thereto, the pair of cooling plates including a first cooling plate arranged in direct contact with the first bus bar assembly portion of the bus bar assembly and a second cooling plate arranged in direct contact with the second bus bar assembly portion of the bus bar assembly, the first cooling plate extending along a first plane orthogonal to the axis of the at least one battery cell and the second cooling plate extending along a second plane orthogonal to the axis of the at least one battery cell;
   wherein the first cooling plate includes a first perimeter tube extending within the first plane and encircling at least a portion of the first cooling plate, the first perimeter tube communicating with both of the upper and lower heatsinks, and wherein the second cooling plate includes a second perimeter tube extending within the second plane and encircling at least a portion of the second cooling plate, the second perimeter tube communicating with both of the upper and lower heatsinks;
   wherein the first and second perimeter tubes each include:
   a tube body encircling the at least a portion of the respective first and second cooling plate, the tube body having an inner channel;
   a single coolant supply tube for each of the first and second perimeter tubes, the single coolant supply tube of each of the first and second perimeter tubes connecting the respective tube body to the lower heatsink to supply a coolant to the tube body; and
   a single coolant discharge tube for each of the first and second perimeter tubes, the single coolant discharge tube of each of the first and second perimeter tubes connecting the respective tube body to the upper heatsink so that the coolant in the tube body can be discharged to the at least one upper heatsink; and
   wherein the tube body of each of the first and second perimeter tubes follows a single path extending along a perimeter of the respective first and second cooling plate from the respective single coolant supply tube to the respective single coolant discharge tube, and wherein a thickness of each of the first and second cooling plates in a dimension extending along the axis of the at least one battery cell is greater than a width of the inner channel of the respective first and second perimeter tubes in the dimension, such that the inner channel of the first perimeter tube is received within an interior of the first cooling plate between opposing exterior surfaces of the first cooling plate along the axis, and such that the inner channel of the second perimeter tube is received within an interior of the second cooling plate between opposing exterior surfaces of the second cooling plate along the axis.

2. The battery module according to claim 1, wherein the bus bar assembly includes:
   a first bus bar housing mounted to the first side of the at least one battery cell;
   a second bus bar housing mounted to the second side of the at least one battery cell
   a first connection bus bar coupled to the first bus bar housing so as to contact the first electrode lead of the at least one battery cell;
   a second connection bus bar coupled to the second bus bar housing so as to contact the second electrode lead of the at least one battery cell;
   a first heat transfer member thermally coupled between the first connection bus bar and the first cooling plate; and
   a second heat transfer member thermally coupled between the second connection bus bar and the second cooling plate.

3. The battery module according to claim 2,
   wherein the first heat transfer member is mounted to the first connection bus bar and is in direct contact with the first connection bus bar and the first cooling plate; and
   wherein the second heat transfer member is mounted to the second connection bus bar and is in direct contact with the second connection bus bar and the second cooling plate.

4. The battery module according to claim 2,
   wherein the first and second heat transfer members are made of a thermal interface material.

5. A battery pack, comprising:
   at least one battery module according to claim 1; and
   a pack case configured to receive the at least one battery module therein.

6. A vehicle, comprising:
   at least one battery pack according to claim 5.

7. The battery module according to claim 1,
   wherein the first cooling plate includes a third perimeter tube extending within the first plane and positioned on an opposite side of the first cooling plate from the first perimeter tube, the third perimeter tube communicating with both of the upper and lower heatsinks; and wherein the second cooling plate includes a fourth perimeter tube extending within the second plane and positioned on an opposite side of the second cooling plate from the second perimeter tube, the fourth perimeter tube communicating with both of the upper and lower heatsinks.

\* \* \* \* \*